United States Patent [19]
Dube et al.

[11] Patent Number: 5,122,181
[45] Date of Patent: Jun. 16, 1992

[54] PROCESS AND APPARATUS FOR MELTING CONTAMINATED METALLIFEROUS SCRAP MATERIAL

[75] Inventors: Claude Dube; Ghyslaine Dube, both of Chicoutimi; Wesley Stevens, Jonquiere, all of Canada

[73] Assignee: Alcan International Limited, Montreal, Canada

[21] Appl. No.: 529,206

[22] Filed: May 25, 1990

[30] Foreign Application Priority Data

May 29, 1989 [CA] Canada .................................. 600922

[51] Int. Cl.⁵ .................................................. C22B 4/00
[52] U.S. Cl. ............................................... 75/10.21
[58] Field of Search ...................... 75/10.21, 353, 401

[56] References Cited

U.S. PATENT DOCUMENTS

| | | | |
|---|---|---|---|
| 2,302,981 | 11/1942 | Stern | 75/353 |
| 3,322,529 | 5/1967 | Pollock | 75/353 |
| 4,133,635 | 1/1979 | Fellnor et al. | 432/19 |
| 4,571,258 | 2/1986 | Bamji et al. | 75/10 R |
| 4,877,448 | 10/1989 | Lindsay | 75/10.21 |
| 4,959,100 | 9/1990 | Dube | 75/10.21 |
| 4,960,460 | 10/1990 | Dube | 75/10.21 |
| 4,997,476 | 3/1991 | Linsay | 75/10.21 |

FOREIGN PATENT DOCUMENTS 0035826  9/1981  European Pat. Off. .
212054   1/1984  Fed. Rep. of Germany .

OTHER PUBLICATIONS

"Indirect and Special Arc Furnaces", (author unidentified). *Electric Melting Practice*. (Hallstead Press Division. New York, pp. 99-114).

D. R. MacRae. "Plasma Arc Process Systems, Reactors and Applications." *Plasma Chem. and Plasma Processing*. vol. 9, No. 1 (pp. 85S-118S).

Primary Examiner—Peter D. Rosenberg
Attorney, Agent, or Firm—Cooper & Dunham

[57] ABSTRACT

A process and apparatus for melting contaminated metalliferous scrap material are disclosed. The process comprises introducing the contaminated material into a melting furnace, heating the material by means of a plasma at a temperature below the melting point of the metal at which the non-metallic contaminants are volatilized in an atmosphere which is preferably inert or has low reactivity with the metal under the process conditions while displacing at least some of the material within the furnace interior, withdrawing volatile contaminants from the furnace, increasing the temperature in the furnace preferably while maintaining an atmosphere of low reactivity in the furnace in order to melt the metal while preferably displacing at least some of the material in the furnace interior, and removing molten metal from the furnace. The process allows scrap material to be melted with good metal recovery without the need for separate decontaminating apparatus. The process can also avoid the need to shred the scrap and to add large amounts of fluxing salts to separate the molten metal from remaining dross. A rotary furnace heated by means of a continued arc plasma torch is preferably employed in the apparatus which also preferably comprises an incinerator for oxidizing the volatile contaminants withdrawn from the furnace.

24 Claims, 4 Drawing Sheets

PROCESS AND APPARATUS FOR MELTING CONTAMINATED METALLIFEROUS SCRAP MATERIAL

BACKGROUND OF THE INVENTION

1. Field of the Invention

This invention relates to a process and apparatus for melting contaminated metalliferous scrap material. More particularly, although not exclusively, the invention relates to the melting of dirty, oily or coated aluminum scrap material.

2. Description of the Prior Art

Scrap material made of aluminum or aluminum alloy is generally recycled by melting the scrap and casting the molten metal into ingots suitable for re-use. When the scrap is contaminated with non-metallic materials, especially organic materials, it is not desirable to melt the scrap without first subjecting it to a heat treatment at a temperature below the melting point of the metal in order to drive off volatile components or to decompose gas-generating materials. If this is not done, there may be violent gas evolution during melting or excessive smoke and flame which would put heavy intermittent demands on fume control systems. Furthermore, the direct melting of contaminated thin gauge scrap in air undesirably results in large metal losses due to oxidation, e.g. as high as 15% by weight.

There are various known processes for removing the volatiles from contaminated scrap but these processes generally take place in a furnace or apparatus which is separate from the melting equipment (normally a conventional melting furnace or sidewell furnace) and thus involve a heavy capital outlay. Moreover, if the decontamination step (removal of volatiles) is carried out merely by heating the scrap in air or in atmospheres containing such gases as carbon dioxide or water vapour, a thick layer of oxide is formed on the scrap during the decontaminating process and this not only results in loss of recoverable metal when the scrap consists of thin gauge material but also causes problems during the melting step. In particular, the presence of an oxide film on the metal makes it necessary to add a large amount of a salt flux to the scrap during the melting step in order to obtain an efficient separation of the metal from the oxide surface layers, but the use of a flux means that a salt cake remains after the melting process and this poses disposal problems since such by-products are pollutants when disposed in land fill sites.

Another disadvantage of the conventional scrap decontamination methods is that the scrap must usually be separated into small pieces (if it is not already in this form) before it is subjected to the decontamination step. In order to reduce transportation costs, many forms of scrap are compressed into bales at the collection site, and so these bales have to be crushed, shredded or chopped into small pieces before they are introduced into the decontamination apparatus. Other forms of scrap generally have to be divided in the same way. This is necessary not only to ensure that all of the contaminated surfaces are exposed during the decontamination step, but also that the decontaminated product can be properly accommodated by the melting furnace. This crushing or separation step requires the provision of bulky and expensive equipment in addition to the decontamination and melting furnaces and again this results in large capital outlays.

An alternative process for continuous melting of light metal scrap is disclosed in East German Patent No. 212,054 to Primke et al (assigned to VEB Mansfeld-Kombinat Wilhelm Pieck). In this process, aluminum or other light metal scrap is melted in a plasma melting furnace employing nitrogen gas as the plasma-producing medium. In order to avoid undue reaction between the aluminum and nitrogen owing to catalysis caused by the contaminants on the metal, gaseous and dusty impurities are first removed from the scrap by suction and the scrap is fed below the surface of the metal melt to avoid direct contact between remaining impurities and the plasma arc or the furnace atmosphere above the bath. However, the apparatus required to carry out such a process is complicated and expensive because it requires a furnace with a raisable refractory chute for the feeding of the scap and a suction device for removal of impurities. The process also requires scrap which is shredded, cleaned, dried and preheated before charging which restricts and complicates the procedure.

OBJECT OF THE INVENTION

An object of the present invention is therefore to provide a process and apparatus capable of melting contaminated metalliferous scrap with good recovery but without some or all of the above complexities and disadvantages.

SUMMARY OF THE INVENTION

According to one aspect of the present invention, there is provided a process for melting contaminated metalliferous scrap material comprising a metal and non-metallic contaminants, which process comprises introducing the contaminated material into a melting furnace having a furnace interior, decontaminating said material by heating said material by means of a plasma at a temperature below the melting point of the metal at which the non-metallic contaminants are volatilized while displacing at least some of said material within the furnace interior, withdrawing volatile contaminants from said furnace, increasing the temperature of the material in order to melt said metal, and removing molten metal from said furnace.

According to another aspect of the invention, there is provided an apparatus for melting metalliferous scrap material which comprises a melting furnace having a furnace interior for receiving contaminated metalliferous scrap material containing metal and non-metallic contaminants, a plasma generator for heating material in said furnace, means for displacing at least some of said scrap material within said furnace interior, means for withdrawing gas containing contaminants from said furnace, means for oxidizing and discharging said contaminants, and means for removing molten metal from said furnace.

DETAILED DESCRIPTION OF THE PREFERRED EMBODIMENTS

Figure 1:
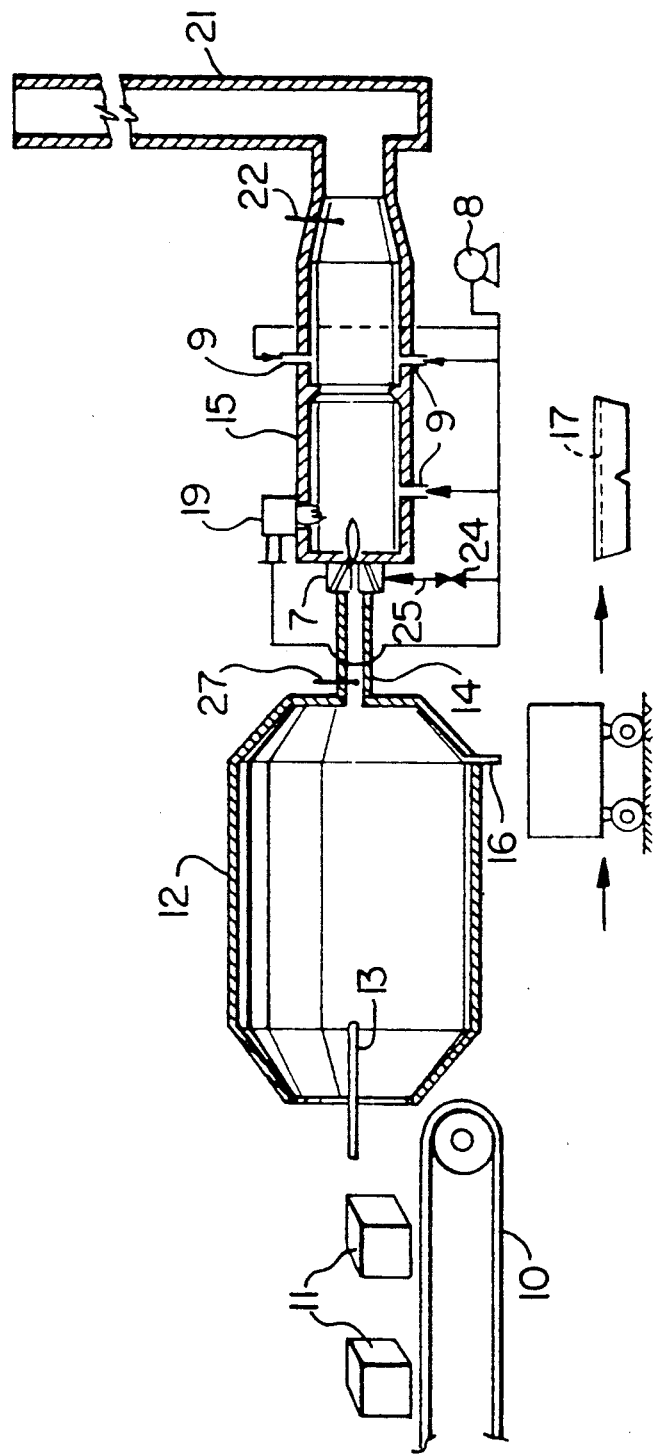
FIG. 1 is a schematic representation of a presently preferred form of the process and apparatus of the present invention.

The metalliferous scrap material which may be used in the present invention is any type of metal scrap coated with such contaminants as oils (e.g. cutting and rolling oils), oil in water emulsions, hydrocarbon-based paints, lacquers, epoxy compounds, plastics, etc. The material may be of any shape or size, including thin gauge material or relatively small particles. The melting of bulk material (e.g. metal castings) could also if desired be carried out by the method of the present invention. The present invention is particularly suited for the melting of such aluminum scrap as used beverage cans, trimmings from can manufacture, clean painted aluminum scrap, thin foil (e.g. 15 micron foil or 5 micron converter foil), machine turnings and sawings, insulated aluminum electrical cables etc. As noted above, the scrap may be in baled form, including highly compressed "briquettes" or "biscuits." No size restrictions apply to the compressed material to be treated, except that it must of course fit into the charge door of the furnace, and shredding is not usually required before treatment.

While the present invention is especially useful for melting aluminum (or aluminum alloy) scrap, it can also be applied to the melting of other scrap materials, e.g. heavy non-ferrous scrap such as copper base alloys. For example, insulated copper cable can be melted by the process of the invention.

The present invention makes use of a single furnace for both the decontamination and melting steps and thus reduces the complexity and normally the cost of the apparatus compared to conventional equipment. The decontamination and melting are carried out sequentially so that the material is decontaminated before it is melted. The scrap, during the decontamination step, is exposed to the atmosphere in the furnace and is heated by a plasma so that the removal of contaminants is essentially complete before melting commences. The furnace should include means for displacing at least some (and preferably at least the majority) of the contaminated scrap material within the furnace interior during the decontamination step and also most preferably during the melting step. Incidentally, by the term "displacing" we mean moving from place to place and particularly, although not exclusively, tumbling by means of which material from lower layers can be recirculated to higher layers of the material charge and vice versa. The displacement is necessary during the decontamination step in order to prevent the occurrence of hot spots in the material charge (which is usually a good heat insulator because of its low density) which could result in the loss of metal by volatilization, particularly when the scrap consists of thin gauge metal of low melting point (e.g. aluminum). The displacement of the material also has the advantages of exposing contaminated surfaces of the material to the hot atmosphere for thorough volatilization or decomposition of the contaminants, and of allowing the resulting gases and vapours to escape freely from the interior of the charge to the atmosphere within the furnace. However, the displacement should not be too vigorous or compressed bales may be broken up and light pieces of scrap might be lost by entrainment in the exiting gases or overheating by the plasma. During the melting step, displacement is highly preferred and again has the effect of avoiding the formation of hot spots and of helping to break up clumps of the material, but has the additional advantage of assisting droplets of the metal to coalesce as the material melts so that the material separates easily into a continuous molten metal layer. The displacement also has the advantage, both during the decontamination step and during the melting step, of ensuring good heat distribution throughout the charge so that the steps proceed smoothly and so that the time required for each step can be kept to a minimum. The rate of displacement should be such that these objectives can be achieved.

The displacement may be brought about by the use of a stirring device within the furnace interior, e.g. vertical, horizontal or angled rakes or vanes which are forced through the material charge within the furnace interior. Furthermore, particularly during the melting step, the stirring may be carried out by electrical induction or by compressed gases. Much more preferably, however, a furnace is employed which is itself capable of imparting a continuous or intermittent tumbling action to the charge of material within the furnace interior. Any furnace capable of producing the required tumbling action may be employed in this preferred form of the invention, e.g. a rotary furnace having a furnace chamber capable of undergoing continuous or intermittent rotation in one or both directions about a horizontal or tilted axis, including a rotary furnace of the rocking arc type which alternatively rotates in one and then the opposite directions to cause the furnace contents to adopt a regular rocking motion (such furnaces are disclosed in "Electric Melting Practice" by A. G. E. Robiette, pp 99-114, John Wiley and Sons Inc. (Halsted Press Division), New York, USA, the disclosure of which is incorporated herein by reference). Preferably, the speed of rotation can be controlled so that an appropriate speed for the particular charge of material can be selected and so that the speed of rotation can be varied during the course of the decontamination and melting steps, if desired. The furnace is normally not rotated completely but is rotated only sufficiently to create adequate displacement (tumbling) of the charge. As the process proceeds, the speed of rotation is normally reduced and, during melting, the speed of rotation is usually only that required to ensure mixing and to avoid splashing of the molten metal. The speed of rotation (continuous or intermittent) is usually no greater than 1 r.p.m., preferably no greater than 0.5 r.p.m., and is often about 0.25 r.p.m.

The furnace should be lined with a suitable refractory material capable of resisting the temperatures employed for the decontamination and melting steps and also of resisting the mechanical shocks encountered during the displacement or tumbling motion. The rotary furnace should preferably be closable to exclude the external atmosphere, although of course there must be sufficient venting to allow for the withdrawal of gases containing the volatile contaminants. One or both ends of the preferred rotatable (normally generally cylindrical) chamber may be equipped with a closable door, and the furnace is normally operated on a batchwise basis, although a continuous operation is also possible.

The furnace should be heated by a plasma during the decontamination step, but may be heated by any means capable of generating the required amount of heat without producing highly reactive gases in the interior of the furnace during the melting step. Burners which generate heat by burning hydrocarbon fuels within the furnace interior should be avoided because they produce carbon dioxide and water vapour in the furnace and these gases can cause oxidation of the molten metal. It is therefore preferable to heat the furnace by electricity, e.g. by electrical resistance heaters, by electric arcs or by induction heating. However, in a particularly preferred form of the invention, the heating during both the decontamination step and the melting step is carried out by the use of a plasma either of the contained arc type, which uses a gas as a heat transfer medium, or of the transferred arc type. The contained arc type of plasma is especially preferred because it does not require an electrode to be in constant electrical contact with the material charge (which in this invention is constantly being displaced), because it can be used to introduce a flow of non-reactive gas into the interior of the furnace and because it can be used to direct the heat onto the furnace refractory rather than onto the charge itself and thus help to avoid volatilization of the metal. In the latter case the furnace refractory should be capable of withstanding high temperatures (e.g. more than 3000° F.). High alumina or spinel refractories installed to resist mechanical damage are suitable.

Contained arc plasma torches of various heating powers are commercially available, e.g. from Westinghouse Electric Corporation and Plasma Energy Corporation, both of the USA. Torches ranging in output from about 100 KW to 2.5 MW are currently available and a plasma torch of suitable output can readily be found to match furnaces of different charge capacities.

As mentioned above, the displacement of the charge during the melting step helps the molten metal to coalesce into a continuous layer. This, and also the fact that significant oxidation of the metal is usually avoided during the decontaminating step due to the preferred provision of a substantially inert gas in the furnace interior, means that it is usually unnecessary to use a salt flux during the melting operation in contrast to most prior art techniques, or at least the amount of salt flux required can be drastically reduced to the extent that there are virtually no significant amounts of residue left in the furnace after the metal has been tapped off and thus there are no disposal problems. For example, when it is considered necessary to use a salt flux carrying out the present invention, it is normally necessary to introduce less than 1.0%, and preferably less than 0.2%, by weight of a salt flux based on the weight of the charge of contaminated material, and the amount may often be as little as 0.001 to 0.1%. The use of these small quantities of fluxing salt may be necessary when the scrap forms a highly metallic residue that sticks to the refractory lining of the furnace and thus withholds metal from recovery. The fluxing salt prevents this from occurring.

In order to avoid problems caused by the evolution of gases during the melting step, the melting step should preferably not be commenced until the decontamination step has removed substantially all of the volatile contaminants from the charge. However, in many cases, there may be no need to provide recognizably separate decontamination and melting steps. For example, the contaminated material may be charged to the furnace, displacement and plasma heating sufficient to melt the charge may be commenced and the furnace may be left to operate in this way until the metal is ready to be tapped off. This is because the removal of the volatile contaminants may inevitably be complete before the metal begins to melt. This tends to be the case when one or a combination of the following factors is present: (1) the charge of material consists of large pieces or bales which absorb the heat uniformly so that the temperature rises gradually, (2) the material is contaminated with very little non-metallic material, and (3) the contaminating material is very volatile.

In those cases where distinct decontamination and melting steps are required, heating may be commenced with a power input insufficient to melt the charge and the completion of the decontamination step may be assessed by monitoring the temperature of the gases leaving the furnace and allowing the step to proceed for a predetermined time at a temperature within a certain range below the melting point of the metal, or by monitoring the composition of the gases leaving the furnace and terminating the step when the proportion of contaminants falls below a predetermined value. At the end of the decontamination step, the power input to the furnace is then increased to raise the temperature of the metal above the melting point. When the metal is aluminum, the power input during the decontamination step can be controlled to maintain a bulk gas temperature at the furnace outlet of about 300°-650° C. so as not to exceed the melting point of aluminum. During the melting step, the temperature at the furnace outlet can be raised to about 750° C. or more.

The manner in which the released contaminants are dealt with in the present invention is an important preferred feature. Firstly, the gaseous contaminants are preferably continuously withdrawn from the interior of the furnace as they are generated from the charge by continuously introducing fresh substantially non-reactive gas into the furnace interior and continuously removing contaminated gases from the furnace. After withdrawal from the furnace, the oxidizable contaminants are preferably oxidized by introducing an excess of oxygen into the gas together with a predetermined amount of gaseous fuel and the fuel is ignited in the gaseous stream. The flame produces a temperature of about 750° to 1200° C. which oxidizes hydrocarbons and other oxidizable products in the gas exiting the furnace. The oxidized products, which generally consist of carbon dioxide and water vapour, may then be vented to the atmosphere, if necessary following passage through pollution control equipment. The combustion products should not be returned to the melting furnace because the carbon dioxide and water vapour cause a layer of oxide to form on the metal during the decontamination or melting steps, which results in loss of recoverable metal and in the formation of dross.

When the heating is carried out by means of a plasma torch of the contained arc type, the volume of gas exiting the furnace is quite low, so the volume of exhaust gases discharged to the atmosphere is also quite low and pollution concerns are minimized. The plasma torch may be operated with a non-reactive gas such as argon, carbon monoxide, helium, hydrogen or combinations of these gases. Diatomic gases result in plasmas of higher energies and are therefore preferred. Nitrogen (being diatomic and relatively inexpensive) is a particularly attractive plasma gas but it can result in the formation of metal nitrides at high temperatures, particularly when aluminum is the metal in question. This can result in metal losses and the formation of dross unless conditions are chosen to avoid temperatures at which the nitride readily forms. For example, it may be prudent to use nitrogen only for the decontamination step and to change to another gas for the melting step. Rather than using pure nitrogen, which can be expensive when required in large quantities, it is possible to use a gas produced by reducing the molecular oxygen content of air.

Gases containing 0.5 to about 6% by volume of molecular oxygen can be produced relatively inexpensively by non-cryogenic physical separation means (e.g. those employing diffusion membranes and molecular sieves). Gases with even lower contents (e.g. 0.01 to 0.1% by volume) can be produced inexpensively by a process disclosed in our copending Canadian patent application serial No. 600,923 filed on May 29, 1989, the disclosure of which is incorporated herein by reference. Oxygen or air may even be used as a plasma gas if the scrap is a rather heavy gauge material and if some metal loss due to oxidation can be tolerated. This is because oxidation is less of a problem when thick pieces of scrap are being treated because of the relatively low surface to volume ratio of the scrap.

A plasma torch of the contained arc type may also be used for the introduction of a salt flux in those embodiments where the presence of such a salt is considered desirable during the melting step. Since the amount of salt flux required in the present invention is very small, it may be introduced in the form of a vapour by feeding powdered salt into the operating gas of the plasma. When the powder passes through the plasma, it is vaporized by the high temperatures encountered. This method of introducing the salt flux is not only convenient, it also ensures a rapid and thorough distribution of the salt to all of the constituent particles of the charge.

Once the metal has all been melted, it can be tapped off and the melting furnace should preferably have a suitably located taphole for this purpose, or alternatively the metal may be poured out of the furnace if the furnace is capable of tilting. In the case of reactive metals (e.g. Al-Li alloys), in order to prevent loss of metal during the tapping step, tapping may be carried out under an atmosphere of a gas that is inert to the metal at the tapping temperature. The tapped metal may be cast directly into a chill mould or into a ladle for transfer to a casting furnace associated with any kind of casting process (typically direct chill).

The overall process and apparatus is shown in simplified form in FIG. 1. A conveyor belt 10 supplies compressed bales 11 of aluminum scrap (e.g. used beverage cans) to a rotary furnace 12 equipped with a plasma torch 13 of the contained arc type. Furnace gases are withdrawn through ducting 14 to an incinerator 15 for oxidation of the gaseous contaminants, after which the oxidation products are vented to a stack 21. Molten metal can be withdrawn from the furnace at tapping point 16 and can be cast into ingots 17. The molten metal tapped may, if desired, be transferred to a conventional furnace (not shown) for further treatment or to avoid the energy required for remelting.

The furnace 12 is operated in batches. Firstly, the bales 11 are loaded into the furnace through a charging door which normally carries the plasma torch 13 (so the torch swings out of the way as the charge is being loaded). When charging is complete, the door is closed and rotation of the furnace about its central longitudinal axis is carried out and heating with the plasma torch is commenced. The furnace is normally rotated on an intermittent basis of ⅛ rotation at two minute intervals during the decontamination operation. Continuous rotation is avoided, particularly with dense bales, to avoid excessive mechanical damage of the refractory. The plasma torch is preferably operated at a power level suitable for heating the charge to a temperature just below melting point of the aluminum (or particular aluminum alloy being processed).

Furnace gases are withdrawn through duct 14 as previously stated. The movement of gases can be initiated by means of a fan (not shown) at some point in stack 21 or the movement can be initiated by preheating the incinerator 15 to create an updraft of gases. Once the furnace and incinerator reach their normal working temperatures, the flow of gases normally requires no assistance.

The plasma torch 13 is normally angled in such a way that the plasma gases are directed onto the interior furnace wall rather than onto the charge of scrap material. This results in a heating of the refractory lining of the furnace (not shown) and the charge is then heated by radiation from the heated refractory or by conduction as the charge contacts the hot refractory due to rotation of the furnace.

The heating of the charge first of all dries off any water or moisture that may be present in the scrap and then causes other volatile contaminants to vaporize or decompose. The rotation of the furnace exposes all of the bales to the heat. Even though the scrap is in highly compressed form, gases can escape from the interiors of the bales when the heat penetrates into the bales.

The incinerator 15 has an auxiliary burner 19 supplied with air from blower 8 for operation with a slight excess of air using any suitable hydrocarbon as fuel, such as propane or natural gas. The auxiliary burner serves to preheat the incinerator to operating temperatures before the plasma device is started and also serves as a pilot burner to ignite the principal burner 7 at which combustion of the oxidizable materials in the furnace gases takes place. The fan or blower 8 also supplies into the incinerator through tube 25 the primary air required for burning the combustible gases entering the incinerator through the main burner 7. Blower 8 additionally supplies the primary air required for the auxiliary or pilot burner 19 (as stated) and the secondary air introduced into the incinerator through three inlets 9 as shown in FIG. 1. The combustible gases from the furnace are oxidized in the flame of burner 7, ignition being effected by the auxiliary burner 19. The high temperature in the incinerator causes the contaminants to be oxidized to carbon dioxide and water vapour. The waste gases can then be discharged to the external atmosphere through stack 21, if necessary via conventional scrubbers or precipitators to remove dust and other pollutants.

The incinerator 15 contains a temperature sensor 22 at a position downstream of the auxiliary burner 19 and the secondary air inlets 9 to monitor the temperature of the gas stream. The temperature measurements are used to control the amount of air supplied through a control valve 24 to burner 7 to ensure that complete combustion of the contaminants can be achieved. Periodic or continuous oxygen and/or carbon monoxide (CO) measurements (by equipment not shown) may be carried out to ensure the complete combustion of contaminants and to avoid the use of unnecessary fuel.

The duct 14 contains a temperature sensor 27 to monitor the temperature of the gases leaving the furnace so that the power output of the plasma torch 13 can be regulated to achieve the desired temperature in the furnace 12.

The contained arc plasma torch 13 is operated with a gas as the heat transfer medium. The gas is one that is substantially non-reactive with the aluminum under the process conditions prevailing at the time. Nitrogen (or air from which molecular oxygen has been removed) is the preferred gas during the decontaminating step because of its high heat transfer capability and its relative cheapness compared with other inert plasma gases such as argon or helium. Nitrogen does not react extensively with the aluminum at the decontaminating temperatures (350°-650° C.).

Once the furnace has been operated in this way for a time suitable to remove substantially all of the volatile contaminants from the scrap, the rotation of the furnace is changed from intermittent rotation to continuous rotation at about 0.3 r.p.m and the power output of the plasma torch 13 is increased to raise the temperature of the scrap above the melting point of the aluminum or aluminum alloy. At this stage, or when the furnace was initially charged with the scrap, a salt flux may be added to the charge. The amount of the salt flux added should be no more than 1% of the charge weight (and is preferably about 0.2%) and can be added through the plasma torch device as a vapour, if desired. The quantity of salt is adjusted to the degree of contamination of the charge. After a time sufficient to result in melting of all of the metal, the rotation of the furnace is stopped and the molten metal is tapped off through taphole 16, if necessary under an atmosphere of a non-reactive gas (e.g. nitrogen) and is then dealt with in a conventional manner such as casting into ingots.

Once the furnace has cooled sufficiently, any remaining dross can be removed (if necessary) through the charging door by tilting the furnace down and introducing a scraper device. In most cases, however, residue removal is necessary only occasionally since very little dross is normally produced.

Figure 2:
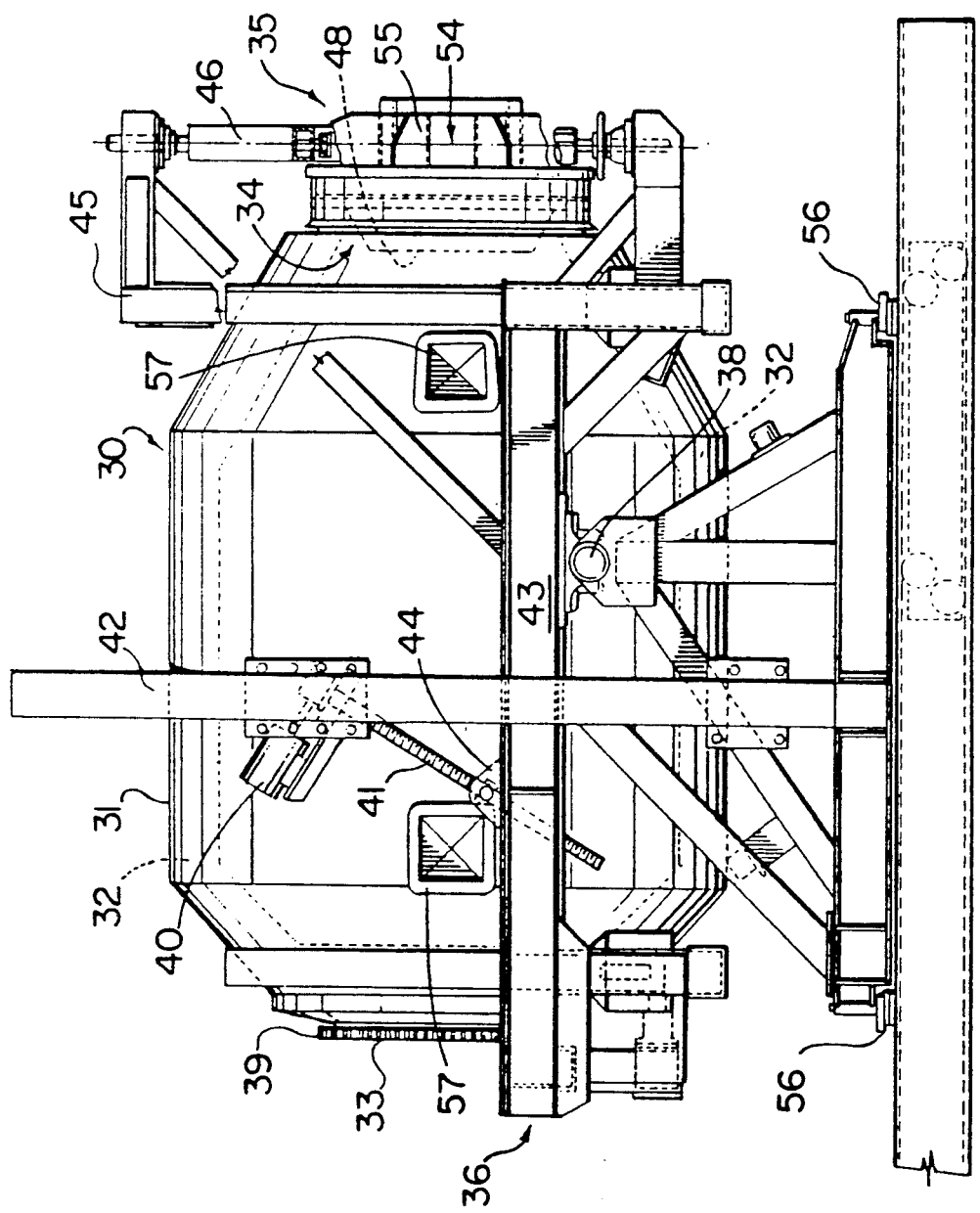
FIG. 2 is a side elevation of a rotary furnace suitable for use in the present invention.
Figure 3:
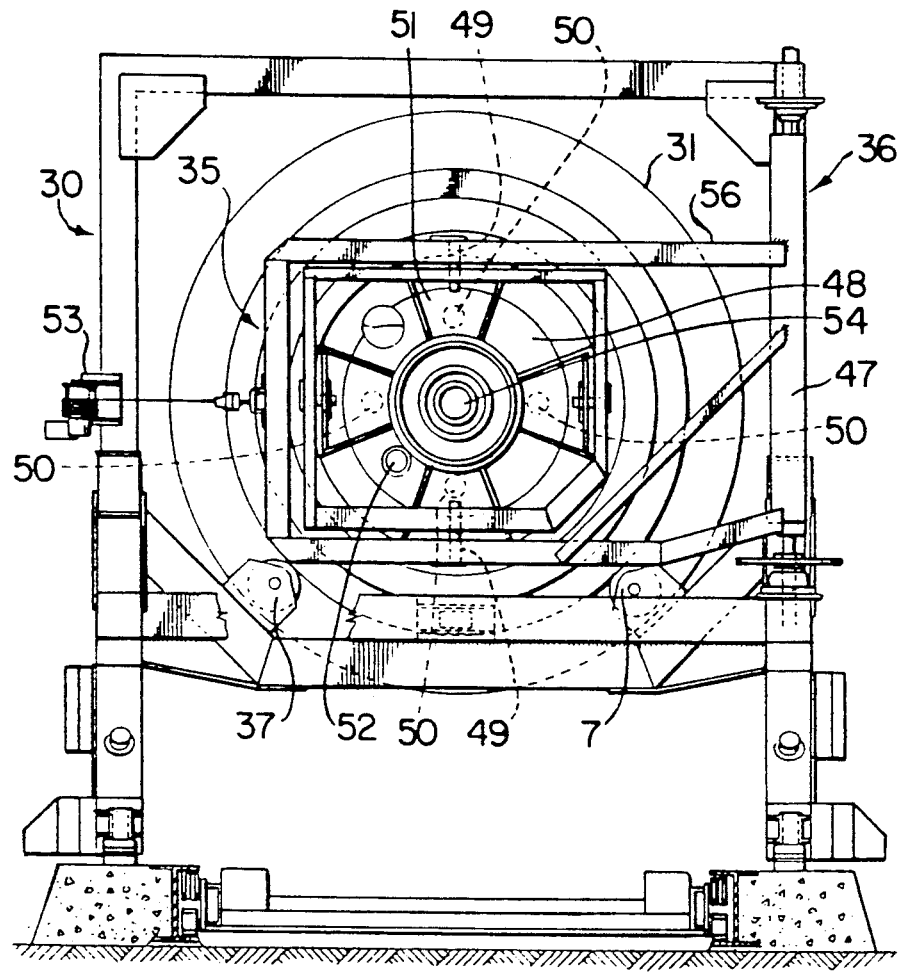
FIG. 3 is an end elevation of the furnace of FIG. 2.
Figure 4:
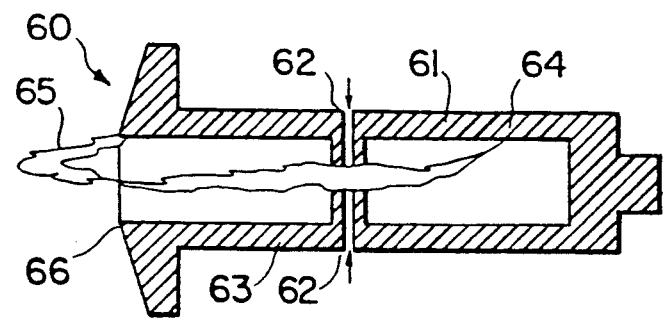
FIG. 4 is a representation of a plasma torch of the contained arc type suitable for heating the furnace of FIG. 2.

FIGS. 2 and 3 show a rotary furnace 30 which is suitable for the present invention when equipped with a plasma torch, e.g. torch 60 as shown in FIG. 4. The furnace consists of a hollow steel cylinder 31 having its interior walls lined with a high temperature-resistant refractory layer 32. The walls of the cylinder taper inwardly at each longitudinal end and one end is closed by an end wall 33 while the other end has an opening 34 which is closable by a door mechanism shown generally at 35. The above structure forms an enclosed furnace for treatment of the scrap.

The cylinder 31 is rotatably and tiltably supported by a framework 36. The framework allows the cylinder to rotate on its longitudinal axis on rollers 37 and also permits it to tilt about pivots 38. The rotation is effected by a gear ring 39 rigidly connected to the cylinder and a chain (not shown) which passes around the gear ring and is driven by a motor (not shown) capable of rotating the cylinder either intermittently or continuously in either direction at speeds up to about 10 r.p.m. or even as high as 20 r.p.m. (although such high speeds are normally not required). Tilting is effected by a motor 40 which rotates a threaded rod 41 connected between an upright gantry member 42 and a horizontal cradle member 43 via a threaded bracket 44. Rotation of the rod causes tilting of the cylinder 31 in either direction about pivot 38 preferably to an extent ranging up to about 30° above or below the horizontal.

The door mechanism 35 is supported by a framework 45 rigidly attached to the tiltable section of the main framework 36. The framework 45 comprises a door mount 46 vertically hinged at one side via a rotatable vertical shaft 47. A circular refractory lined door 48 is supported on the framework 45 by vertical pivots 49 which allow the door to tilt relative to the framework 45 so that the door can seat properly in the opening 44 in the cylinder 31.

The refractory-lined door 48 rotates with the cylinder 31. The door 48 is attached to the non-rotating framework 45 via a low friction annular bearing rotated under the annular channel 51. Escape of gases between the periphery of the opening 34 and the confronting periphery of the door is prevented by positioning a gasket of fibrous material around the furnace opening between the cylinder 31 and the door 48. The door is held closed by a cable and winch arrangement 53 which pulls the door into sealing contact with the cylinder 31, thus compressing the gasket.

The door 48 has a central hole 54 which receives an annular plasma torch mount 55. The walls defining the hole and the engaging parts of the mount form a ball-and-socket type of joint which permits the torch mount to be tilted relative to the longitudinal axis of the hole 54 (and consequently also relative to the central longitudinal axis of the cylinder 31). When a plasma torch is located in the mount 55, it seals the hole 54 against the release of gases but the mount permits the plasma torch to be tilted as required within the furnace. Generally the mount allows the plasma torch to be tilted by up to 15° C. either above or below the central longitudinal axis of the furnace.

The door 48 has holes 50 which open into an annular channel member 51 for directing gases discharged from the furnace to an outlet 52. The outlet 52 is connected to an incinerator 15 (not shown) of the type described with reference to FIG. 1.

A typical contained arc type of plasma torch 60 for use in the present invention is shown in FIG. 4. The torch comprises an elongated tube 61 having gas injection ports 42 located between front and rear electrodes 63 and 64, respectively. An arc 65 is struck between the front and rear electrodes and the gas is converted to plasma and ejected from nozzle 66. The plasma torch normally has a water jacket (not shown) to avoid overheating. The torch can be mounted in the furnace in the manner indicated above with the nozzle 66 projecting into the furnace.

The apparatus described above is operated in the following manner.

The furnace 30 is pre-heated either by means of a conventional heating device (e.g. a gas burner or an electric element) or by means of the plasma torch 60.

A scrap material charge is then charged to the furnace through door 48 with the furnace tilted to the horizontal position by tilting motor 20.

The gasket of fibrous material is then installed around the furnace opening 34 and the door 48 is closed and winch 53 operated to hold the door tightly closed.

The furnace is tilted upwardly (door end high) by up to 30°. A higher tilting angle allows a larger scrap material charge to be handled because the molten metal, when formed, must not rise to the level of the door opening 34. However, the tilting angle should not be so high that a tumbling effect is prevented.

The plasma heating is carried out with the plasma torch 60 angled upwardly from the horizontal, i.e. away from the charge. This ensures that no hot spots are formed in the scrap material. As the plasma torch is operated, the furnace is rotated at a continuous, or preferably intermittent, speed of less than 1 r.p.m. The rotation prevents a hot spot forming in the furnace lining 31 and also conveys the heat to the charge. The temperature of the charge can be monitored either by thermocouples (not shown) buried in the furnace lining 32 and/or by means of a thermocouple mounted in the gas exhaust conduit 52. A computer may be used to enable the speed of rotation of the furnace to be varied according to the temperature of the exhaust gas. The volatile contaminants are fed to the incinerator (not shown) where they are oxidized.

When the charge has been uniformly heated to a decontaminating temperature below the melting point of the metal for a time sufficient to rid the charge of volatile contaminants, the plasma output is increased (and optionally the plasma gas changed) and the speed of rotation of the furnace is reduced until most of the metal has melted. The rotation is then stopped and the molten metal is removed through one or more tapholes 57. The tilting and rotating capabilities of the furnace can be used to direct the molten metal towards one or other of the tap holes. The molten metal may be poured into a drain pan (not shown) located under the furnace.

Figure 5:
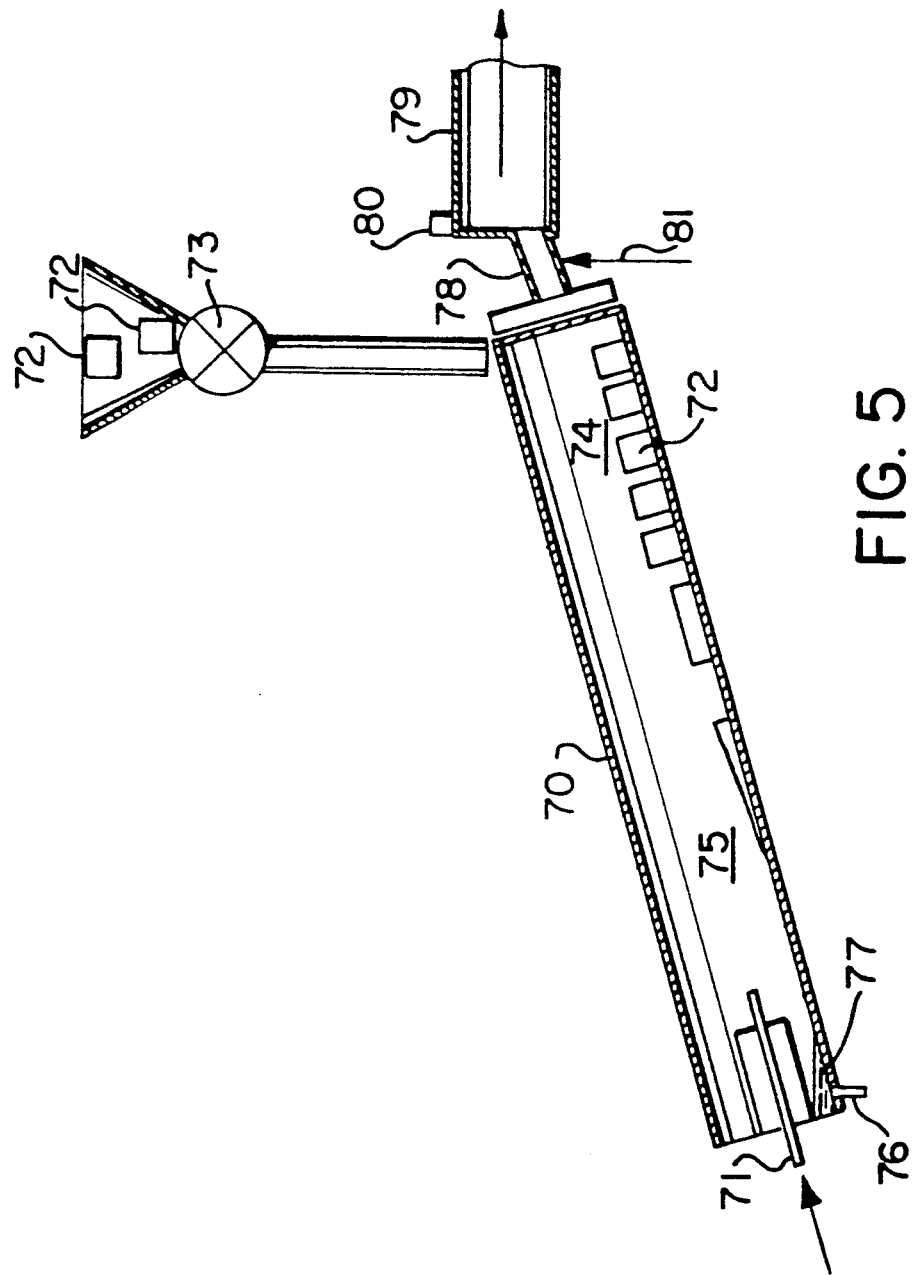
FIG. 5 is a sectional view of a furnace suitable for continuous operation of the invention.

FIG. 5 is a sectional view of an apparatus suitable for carrying out the decontamination and melting steps on a continuous rather than batchwise basis. The apparatus consists of an elongated tubular rotary furnace 70 heated by a contained arc plasma torch 71 using nitrogen or another suitable plasma gas. Contaminated material 72 to be melted is introduced into the furnace through an air lock device 73 into a decontamination zone 74 of the furnace. Heat from the plasma torch heats the refractory walls of the rotating furnace 70 which transfer heat by radiation and/or conduction to the contaminated material 72. The charge gradually moves along the furnace towards the lower end where it enters a melting zone 75 after receiving sufficient heating and displacement to achieve removal of the non-metallic contaminants. The charged material melts in the melting zone 75 and is intermittently cast through a taphole 76 while always maintaining a pool 77 of liquid metal to ensure the integrity of the atmosphere in the furnace. The downward angle of slope of the furnace 70 and the speed of rotation can preferably be adjusted to ensure that the material 72 remains for the desired periods of time in the decontamination zone 74 and the melting zone 75.

The contaminated gases within the furnace 70 are extracted through a duct 78 to an incinerator 79 as in the embodiment of FIG. 1. Combustible gases are ignited by a pilot or auxiliary burner so which also ensures movement of the contaminated gases from the furnace through duct 78 when the furnace is first started. Sufficient air to ensure complete combustion of the contaminated gases to carbon dioxide and water vapour is added through duct 81 and is supplied by a blower (not shown).

The invention is illustrated in further detail by the following Examples which should not be construed as limiting the scope of the invention.

EXAMPLE 1

Process With Air as Plasma Gas

The material melted in this Example consisted of thin gauge (450 microns) used flexible busbar material. An oxide coating was present on the material prior to melting.

A load of 2059 kg of the material was charged to the preheated refractory lined furnace as shown in FIGS. 1-3. The charge was heated with a 1 MW contained arc plasma device with air as the plasma gas. The plasma device was slightly inclined above the horizontal axis of the furnace to avoid direct impingement on the surface of the charge.

The furnace was intermittently rotated (about ⅛ rotation every 2 minutes). The furnace was tilted at a 5 degree angle from the horizontal (higher elevation at the door end as opposed to the outlet end). When the charge reached melting temperature the furnace was continuously rotated at 0.33 r.p.m to optimize the transfer of energy absorbed by the hot refractories to the charge by conduction.

After 88 minutes of heating, the metal temperature was measured at the taphole at 729° C. and subsequently the torch was turned off. 1949 kg of molten metal were tapped from the furnace taphole corresponding to a recovery of metal of 94.7% of the charged weight to the furnace.

A powdery residue weighing 117 kg containing 4.6% aluminum nitride, 1.75% free aluminum metal and the balance being aluminum oxides was cleaned from the furnace chamber.

The average power used during the process was 951 KW for an energy consumption of 681 KW-h/tonne charged to the furnace.

EXAMPLE 2

Process with Nitrogen as the Plasma Gas

The material melted in this Example was identical to that charged in Example 1, namely thin gauge (450 microns) used flexible busbar material. An oxide coating was present on the material prior to melting.

A charge of 2035 kg was loaded into the preheated (refractory hot face temperature of about 350° C. before charging) refractory lined furnace as used for Example 1.

The furnace was intermittently rotated (about ⅛ rotation every 2 minutes). The furnace was tilted at a 5 degree angle from the horizontal (higher elevation at the door end as opposed to the outlet end). When the charge reached melting temperature the furnace was continuously rotated at 0.33 rpm to optimise the transfer of energy absorbed by the hot refractories to the charge by conduction.

After 126 minutes of heating, the metal temperature was measured at the taphole at 720° C. and subsequently the torch was turned off. 1988 kg of molten metal were tapped from the furnace taphole corresponding to a recovery of metal of 97.7% of the charged weight to the furnace.

A residue weighing 51 kg containing 12.4% aluminum nitride, 1.70% free aluminum metal and the balance being aluminum oxides was cleaned from the furnace chamber.

The average power used during the process was 908 KW for an energy consumption of 949 KW-h/tonne charged to the furnace.

The longer process time and resulting higher energy requirements for this Example using nitrogen as the plasma gas as opposed to air used in Example 1 were determined to be due to less heat being stored in the furnace refractories before the furnace was charged. Secondly, energy requirements were higher due to reduced torch efficiency with nitrogen as plasma gas as opposed to air. As well, the nitridation reaction of aluminum is much less exothermic than the oxidation reaction of aluminum resulting in higher external energy input.

The improved recovery as seen in this Example as compared to Example 1 demonstrates the more harmful effect of using air as the plasma gas resulting in a 3% reduction in the metal recovered.

EXAMPLE 3

Melting of Baled Aluminum Sawchips - Air as Plasma Gas

A charge of 2007 kg of aluminum sawchips in baled form was melted in the same apparatus as for the previous Examples with substantially the same procedures. The melting process required 1.4 hours (84 minutes) and the molten metal was cast to a temperature of 745° C. Molten metal weighing 1892 kg was tapped for a metal recovery of 94.3%, with a residue of 128 kg being removed from the furnace. The residue consisted of aluminum nitride (3.4%), metallic aluminum (2.3%) and the balance of aluminum oxides.

The plasma device was operated at an average power of 935 KW for an energy requirement of 669 KW-h/tonne charged.

EXAMPLE 4

Melting of Baled Aluminum Sawchips - Nitrogen as Plasma Gas

A charge of 2110 kg of aluminum sawchips in baled form was melted in the same apparatus as for the previous Examples with substantially the same procedures. The melting process required 1.9 hours (114 minutes) and aluminum weighing 2026 kg was tapped for a metal recovery of 96.0%. No residue was formed but a metallic material completely covered the refractory surfaces of the furnace.

The plasma device was operated at an average power of 993 KW for an energy requirement of 897 KW-h/tonne charged.

In a subsequent treatment, again with nitrogen as the plasma gas, 1718 kg of aluminum sawchips was charged with a salt flux of 0.2% by weight being added with the charge.

After 1.6 h of melting, 1691 kg of metal were tapped from the furnace for an overall recovery of 98.4%.

The powdery residue weighed 35 kg and comprised a mixture of salt flux, aluminum nitrides (13.6%), metallic aluminum (1.6%) and oxides.

The plasma device was operated at an average power of 974 KW for an electrical energy consumption rate of 906 KWh/tonne charged.

EXAMPLE 5

Melting of Compressed Briquettes of Aluminum Can Body Process Scrap with an Air Plasma Gas A charge of 1692 kg of compressed briquettes of aluminum can body process scrap containing 0.72% by weight of hydrocarbons (rolling oils) was melted in the apparatus as described above.

After 1.5 h of melting, 1583 kg of molten aluminum were recovered at a temperature of 730° C. for a recovery of 93.6% based on initial charge weight. The residues removed from the furnace weighed 136 kg. The plasma device was operated at a power of 928 KW for a specific energy consumption of 813 KW-h/ton charged.

EXAMPLE 6

Melting of Compressed Briquettes of Aluminum Can Body Process Scrap with an Nitrogen Plasma Gas A charge of 1986 kg of compressed briquettes of aluminum can body process scrap containing 0.72% by weight of hydrocarbons (rolling oils) was melted in the apparatus as described above.

After 2.5 h of melting, 1871 kg of molten aluminum were recovered. Without any cleaning of the furnace a second charge of 1927 kg of the same material was charged. After a heating period of 2.2 hours, 1941 kg of molten aluminum was tapped at a temperature of 879° C. The overall recovery for the two tests combined was 97.4%. The residues were left in the furnace for recovery following a subsequent melting trial. The average power for these combined trials was 961 KW with a specific energy consumption of 1170 KW-h/tonne charged.

What we claim is:

1. A process for producing molten metal from contaminated metalliferous scrap material comprising a metal and non-metallic contaminants, which process comprises introducing the contaminated material with less than 1% by weight of a fluxing salt into a melting furnace having a furnace interior, decontaminating said material by heating said material by means of a plasma at a temperature below the melting point of the metal at which the non-metallic contaminants are volatilized while displacing at least some of said material within the furnace interior, withdrawing volatile contaminants from said furnace, increasing the temperature of the material by further plasma heating in order to melt said metal, and removing molten metal from said furnace.

2. A process according to claim 1 wherein said metal is selected from the group consisting of aluminum and aluminum alloys.

3. A process according to claim 2 wherein said scrap material is contaminated with materials selected from the group consisting of oils, oil in water emulsions, hydrocarbon-based paints, epoxy compounds, lacquers and plastics.

4. A process according to claim 1, wherein said displacement of said material during said decontaminating step is effected by continuously tumbling said material within said furnace interior.

5. A process according to claim 1, wherein said displacement of said material during said decontaminating step is effected by intermittently tumbling said material within said furnace interior.

6. A process according to claim 1, wherein said volatile contaminants withdrawn from said furnace are oxidized and discharged to an external atmosphere.

7. A process according to claim 1, wherein said volatile contaminants withdrawn from said furnace are oxidized by passing the contaminants through a duct, introducing a fuel and excess air into said duct and igniting said fuel and contaminants in said duct.

8. A process according to claim 1, wherein said material is heated by a plasma both in said decontaminating step and in said melting step, and wherein said material is heated at a first power level insufficient for raising the temperature of said material above the melting point of the metal in order to effect said decontaminating step and then the material is heated at a second higher power level to effect said melting step.

9. A process according to claim 1, wherein said material is heated by a plasma both in said decontaminating step and in said melting step, and wherein said material is heated at a single power level capable of melting said metal for both said decontaminating step and said melting step, said contaminants and/or said metal being such that said contaminants are substantially completely volatilized before said metal begins to melt.

10. A process according to claim 1, wherein up to 0.2% by weight of a fluxing salt is added to said scrap material.

11. A process according to claim 1, wherein 0.001 to 0.1% by weight of a fluxing salt is added to said scrap material.

12. A process according to claim 1, wherein said molten metal is protected from oxidation when removed from said furnace by providing a protective atmosphere of a substantially non-reactive gas.

13. A process according to claim 1, wherein said material is selected from the group consisting of used beverage cans, trimmings from can manufacture, clean painted aluminum scrap, thin foil, machine turnings, machine sawings, and insulated cable.

14. A process according to claim 1, wherein said scrap material is in the form of compressed bales.

15. A process according to claim 1, wherein a gas which is substantially non-reactive with said metal is supplied to said furnace interior during said decontaminating step.

16. A process according to claim 1, wherein a gas which is substantially non-reactive with said metal under the prevailing conditions is supplied to said furnace interior during said melting step.

17. A process according to claim 15 wherein said gas is selected from the group consisting of hydrogen, nitrogen, helium, argon, methane and a gas produced by reducing the molecular oxygen content of air to about 6% by volume or less.

18. A process according to claim 15 wherein said plasma used for said decontamination step is a contained arc plasma employing a gas as a plasma generating medium and wherein said gas employed for said plasma forms said substantially nonreactive gas supplied to the furnace interior.

19. A process according to claim 16 wherein said scrap is heated during said melting step with a contained arc plasma employing a gas as a plasma generating medium and wherein said gas employed for said plasma forms said substantially nonreactive gas supplied to the furnace interior.

20. A process according to claim 1 wherein said plasma used for said decontamination step is a contained arc plasma employing air as a plasma generating medium.

21. A process according to claim 1 wherein a contained arc plasma is used for heating said scrap in said melting step, said plasma employing air as a plasma generating medium.

22. A process according to claim 1, wherein said process is carried out on a batch-wise basis.

23. A process according to claim 1, wherein said process is carried out continuously.

24. A process for producing molten metal from particulate contaminated scrap material comprising a metal selected from aluminum and aluminum alloys, and non-metallic contaminants, which process comprises:

introducing said scrap material with less than 1% by weight of a fluxing salt into an interior of a melting furnace capable of being at least partially rotated to cause tumbling of said scrap material;

while at least partially rotating said furnace, heating said scrap material with a contained arc plasma torch to a temperature which is sufficient to volatilize a volatilizable component of said non-metallic contaminants but which is below the melting point of said metal, said heating being continued for a time sufficient to volatilize substantially all of said volatilizable component;

raising the temperature of said scrap in said melting furnace by further heating with a contained arc plasma torch to a temperature above the melting point of said metal in order to melt said metal; and removing molten metal from said melting furnace.

* * * * *